Feb. 17, 1970   F. W. JAKSHA ET AL   3,496,329
WELDING SYSTEM
Filed July 16, 1965                 2 Sheets-Sheet 1

INVENTORS
FRED W. JAKSHA
MARCEL R. SOMMERIA
BY
Mueller, Aichele & Rauner
ATTYS.

INVENTORS
FRED W. JAKSHA
MARCEL R. SOMMERIA

ATTYS.

United States Patent Office 3,496,329
Patented Feb. 17, 1970

3,496,329
WELDING SYSTEM
Fred W. Jaksha, Chicago, and Marcel R. Sommeria, Palos Heights, Ill., assignors to Welding Research, Inc., Chicago, Ill., a corporation of Illinois
Filed July 16, 1965, Ser. No. 472,578
Int. Cl. B23k 9/10
U.S. Cl. 219—135                                8 Claims

ABSTRACT OF THE DISCLOSURE

Tungsten inert gas spot welding system having plurality of torches or electrodes energized from common welding current supply through separate transformer windings and rectifier circuits, and with high frequency arc starting supply having separate circuits connected to the individual torches. The welding current and the high frequency arc starting circuits are isolated from each other. The opposite ends of a secondary winding of the arc starting supply are connected to two torches for starting the arcs thereat in series. A common control circuit controls the starting and welding current supplies and the flow of gas at the arc.

---

This invention relates generally to arc welding systems, and more particularly to a tungsten inert gas electric arc welding system for simultaneously producing a plurality of spot welds.

Tungsten inert gas (TIG) electric arc welding systems are currently used in many applications. Such systems, however, require that auxiliary provisions be made for starting the welding arc. In some systems, the welding electrode is momentarily placed in contact with the work and then retracted to draw an arc. This has the disadvantage that a mechanical system is required to physically move the welding electrode, and such systems are complex and expensive, and also take an objectionably long time to operate.

Other arc starting systems have been provided which apply a very high voltage at the electrode to strike the arc. These have been quite complex particularly where a plurality of torches are used to provide a plurality of spot welds, since a separate arc starting circuit is required for each torch. In some systems an arc starting circuit is switched from one electrode to another, but this has the disadvantage that complex switching equipment is required, and the welds cannot be produced simultaneously.

It is, therefore, an object of the present invention to provide an improved arc starting system for a multiple arc welding system.

Another object is to provide a simple and reliable arc starting system which will simultaneously start arcs at a plurality of welding torches.

A further object of the invention is to provide an arc starting circuit for a TIG spot welding system which is substantially independent of the welding current circuit.

Still another object of the invention is to provide a mutiple arc welding system wherein arcs at a plurality of electrodes are started simultaneously and the welding current supplied to all electrodes is controlled by a single unit.

A feature of the invention is the provision of a welding system including an arc starting circuit having a high frequency generator which is connected through an output transformer to a plurality of welding torches to initiate welding arcs thereat. The transformer may have one or more secondary windings with terminals at both ends thereof which are connected to two torches, to start arcs between the two torches and the work piece which are in series through the work piece.

Another feature of the invention is the provision of an arc welding system including an arc starting circuit for causing initiation of arcs at a plurality of welding torches, and a welding current circuit having branches connected to the individual torches, with the starting circuit and the welding current circuit being connected to the torches in parallel and being isolated from each other so that current from one circuit does not flow through the other circuit.

Another feature of the invention is the provision of a TIG spot welding system wherein a plurality of welding arcs are started simultaneously by action of a starting circuit having a spark gap and a resonant circuit including a transformer with secondary windings connected to the welding electrodes, and a welding current supply having an output transformer with a secondary winding connected to each torch through a separate rectifier circuit, so that the welding current supplied to all electrodes is controlled simultaneously by the welding current supply. A large number of torches can be operated simultaneously to produce a corresponding number of welds, with individual welding current rectifier circuits supplying welding current to the torches, and with a starting circuit having a branch for each two torches if an even number of torches is used. (If an odd number of torches is used, a separate branch is required for the odd torch.)

In accordance with the invention, a TIG spot welding system is provided wherein welds are simultaneously produced by arcs at the electrodes of a plurality of torches. A high frequency starting circuit is provided for the torches including a spark gap and a resonant circuit for providing high frequency current in a transformer. High frequency starting potential is derived from one or more secondary windings of the transformer and applied to the torches to initiate an arc thereat. Two torches may be connected to the opposite ends of a single secondary winding so that the arcs thereat are started in series. Welding current is applied to the torches from a common welding current supply which is controlled to provide the desired current level for the desired time. Individual rectifier circuits are provided between the welding current supply and the torches to apply current individaully thereto. The arc starting circuit and the welding current circuit are connected in parallel to the torches and are isolated from each other, with the welding current circuit blocking the high frequency arc starting current, and the starting circuit blocking the direct current welding current.

Figure 1:
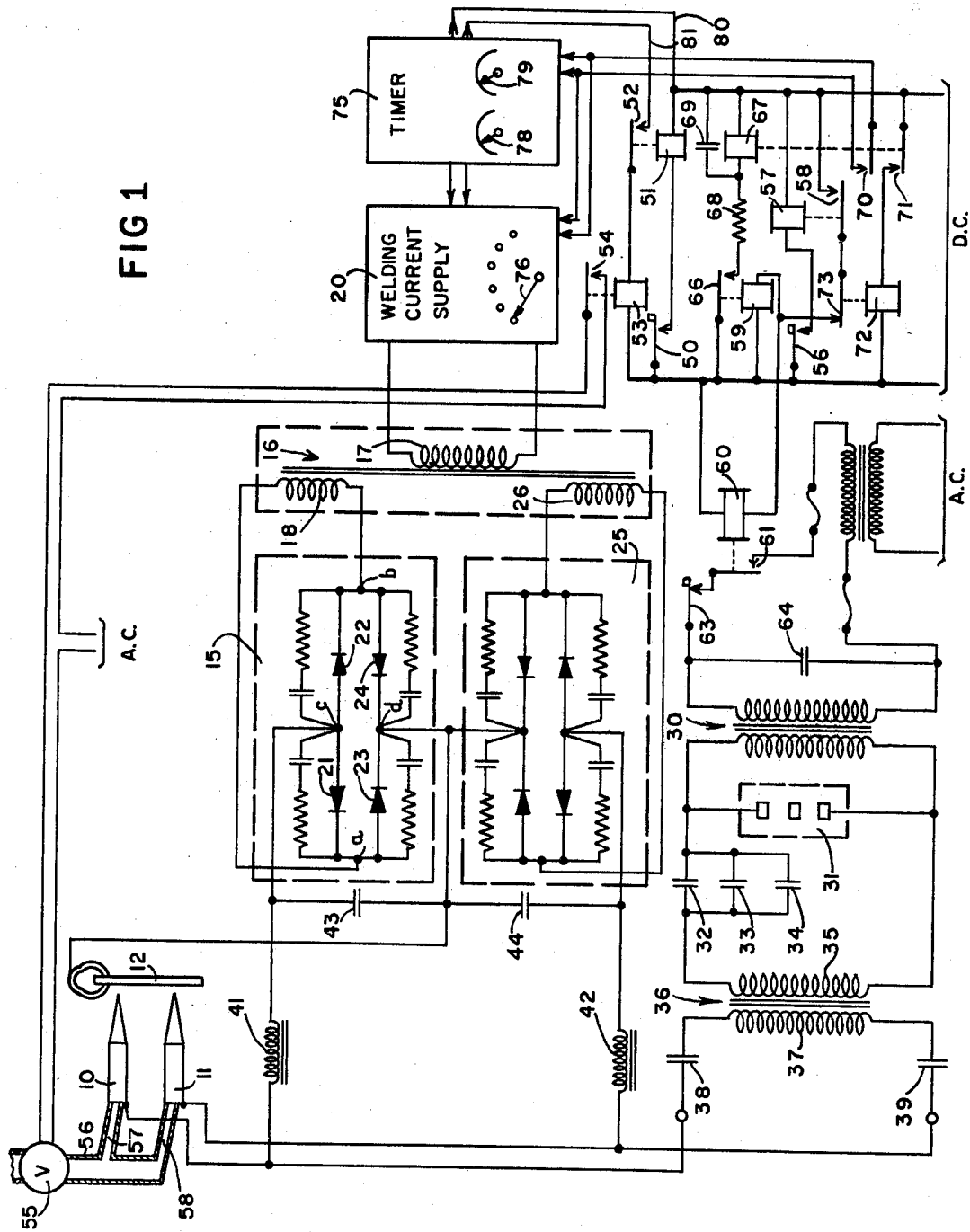
FIG. 1 is a circuit diagram of a system in accordance with the invention for simultaneous operation of two torches.

Referring now to the drawing, in FIG. 1 there is illustrated a welding system including torches 10 and 11 each including an electrode arranged to produce an arc with work piece 12. These torches are used in a tungsten inert gas welding system wherein inert gas such as helium or argon surrounds the arc produced between the welding electrode and the work piece. Welding current is applied to torch 10 through the rectifier bridge circuit 15 from the welding current transformer 16. Welding current is applied to the primary winding 17 of transformer 16 from welding current supply 20. The bridge rectifier circuit 15 includes rectifiers 21, 22, 23 and 24 to which alternating current is applied from the secondary winding 18 of the transformer 16. The alternating current is applied at points a and b of the bridge, and direct current is derived from points c and d. Each diode is shunted by a series connected resistor and capacitor to protect the same. The bridge rectifier circuit is of known construction.

Welding current is applied to the welding torch 11 by rectifier bridge 25 to which current is supplied from the secondary winding 26 of transformer 16. The bridge 25 may be identical to the bridge 15. Since both torches are supplied from the same welding current source, the currents applied to both torches are simultaneously controlled.

To start the arcs at the torches 10 and 11, a high frequency arc starting circuit is provided. Alternating current is applied to transformer 30, which steps up the power line voltage of 115 volts to a voltage of the order of 3000 volts. The voltage at the secondary winding of transformer 30 breaks down the spark gap 31 during each half cycle of the alternating current. The primary winding 35 of transformer 36 is connected to the spark gap 31 by capacitors 32, 33 and 34. The capacitors 32, 33 and 34 and the primary winding 35 are resonant at a high frequency which may be of the order of one megacycle per second. The arcs produced at the spark gap shock excite the resonant circuit so that oscillations occur in the primary winding 35 of the transformer. The high frequency oscillations so developed are stepped up in transformer 36 and applied from the secondary winding 37 thereof through capacitors 38 and 39 to the torches 10 and 11. The high frequency voltage acts to strike arcs between the torches 10 and 11 and the work piece 12, which arcs are effectively in series.

The choke coils 41 and 42 which connect the bridge rectifier circuits 15 and 25 to the torches 10 and 11, and the shunt capacitors 43 and 44 act to block the high frequency current so that it is not applied to the bridge rectifier circuits 15 and 25. Accordingly, the high frequency current is all applied to the torches 10 and 11. The capacitors 38 and 39 connected between the secondary winding 37 and the torches block the direct current outputs of the bridge rectifier circuits 15 and 25, so these current must flow through the torches.

The welding system as shown in FIG. 1 can be used for automatic operation in an automatic production line. The piece being worked on may be moved from one position to another on a conveyor or the like. The control circuit for the welding operation is illustrated schematically in FIG. 1 and includes a switch 50 which may be automatically operated when the work piece approaches the welding position. This causes operation of relay 51 to close contacts 52 thereof. Contacts 52 energize relay 53 to close contacts 54 thereof. Contacts 54 are connected in a circuit to operate solenoid valve 55 which applies an inert gas to line 56. Line 56 supplies branch lines 57 and 58 which extend to the two torches 10 and 11, to apply the inert gas thereto.

When the work piece reaches the welding position, switch 56 of the control system is closed. This operates relay 57 to close contacts 58 thereof. Contacts 58 energize relays 59 and 60 which are connected in parallel. Relay 60 closes contact 61 to apply alternating current from transformer 62 to the primary winding of transformer 30. This circuit is completed through the manual on-off switch 63. Capacitor 64 provides power factor correction for the current drawn by transformer 30. It is therefore seen that when relay 60 is operated, transformer 30 applies a voltage to the spark gap 31 to break down the gap, and the high frequency resonant circuit is shock excited to apply high frequency starting current to the torches 10 and 11.

Relay 59 which is energized with relay 60 acts to close contacts 66 thereof to energize relay 67 through the delay circuit including resistor 68 and capacitor 69. Relay 67 will not operate until capacitor 69 is charged to a predetermined value, so that a delay takes place. Relay 67 when operated closes contacts 70 and 71 thereof. Contacts 70 operate to actuate the welding current supply 20 and the timer 75. The welding current supply may derive current from a three phase source and apply controlled current to the winding 17 of transformer 16. This controls the current supplied by the bridge rectifiers 15 and 25 to the torches 10 and 11 to provide the welding action. Because of the delay in operation of relay 67, the welding current is applied after the arc has been initiated by the high frequency circuit. The welding current supply may include a manual control 76 which sets the level of the current applied to the transformer 16 as may be required for a particular welding operation.

Contacts 71 of relay 67 energize relay 72 to open contacts 73 which open the circuit to relay 60. This deenergizes the starting circuit at the time when welding current is applied to the torches.

Timer 75 when actuated by contacts 70 starts a first timing period which determines the weld time. This can be set by control element 78 as desired for a particular welding operation. The timer also controls a second timing period set by control 79. This opens the circuit through conductors 80 and 81 to break the circuit to relay 53. This causes contacts 54 to open to release the solenoid valve 55. Accordingly, the supply of inert gas to the torches is discontinued a short time after the welding current has been terminated.

Figure 2:
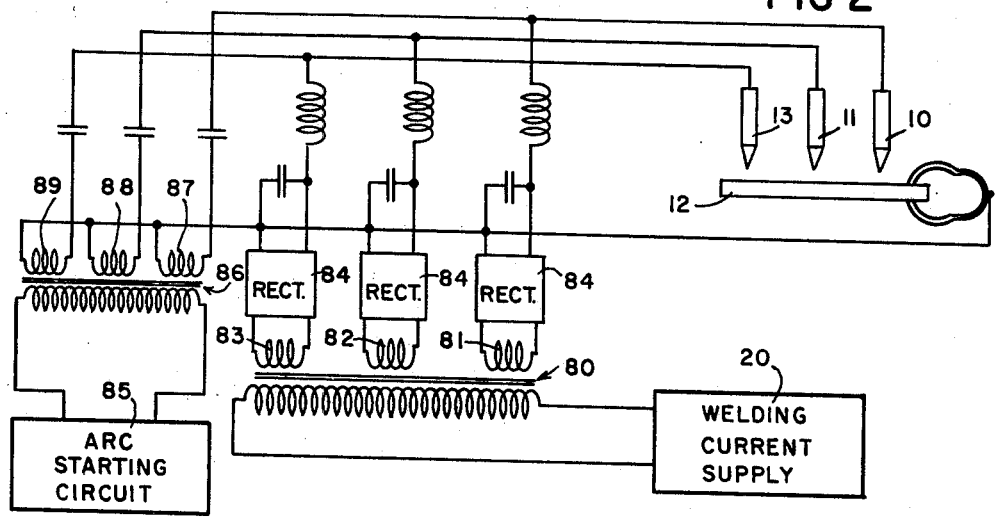
FIG. 2 illustrates a modification of the system of FIG. 1 for operating three torches.

In FIG. 2, there is illustrated schematically a modified welding system of the invention wherein three welding torches are used. In this system, the welding current supply 20 supplies current to transformer 80 which has three secondaries 81, 82 and 83. Each of these secondaries supplies current to a separate rectifier circuit 84, which is connected to one of the torches 10, 11 and 13. A single high frequency arc starting circuit 85 supplies current to transformer 86 which has three secondaries 87, 88 and 89. The high frequency arc starting circuit may be the same as shown in FIG. 1, with a spark gap being used to shock excite a high frequency resonant circuit. The three secondary windings 87, 88 and 89 are individually coupled to the welding torches 10, 11 and 13. Capacitors are included in the starting circuit to block DC from the rectifier circuits, and a series choke and shunt capacitor are connected at the output of each rectifier circuit 84 to block the high frequency current from the arc starting circuit.

The system of FIG. 2 can be operated by the same control circuit which is illustrated in FIG. 1. The duration and magnitude of the welding current supplied to the torches 10, 11 and 13 is controlled by the welding current supply 20. It will be obvious that a larger number of torches can be used with a corresponding number of rectifier circuits for connecting the welding current supply to the individual torches. In FIG. 2, the high frequency transformer has a secondary winding for each torch, with the high frequency voltage being applied between each torch and the work piece, rather than between two torches. It will be apparent that a number of secondary windings can be provided corresponding to the number of torches which are to be simultaneously operated.

Figure 3:
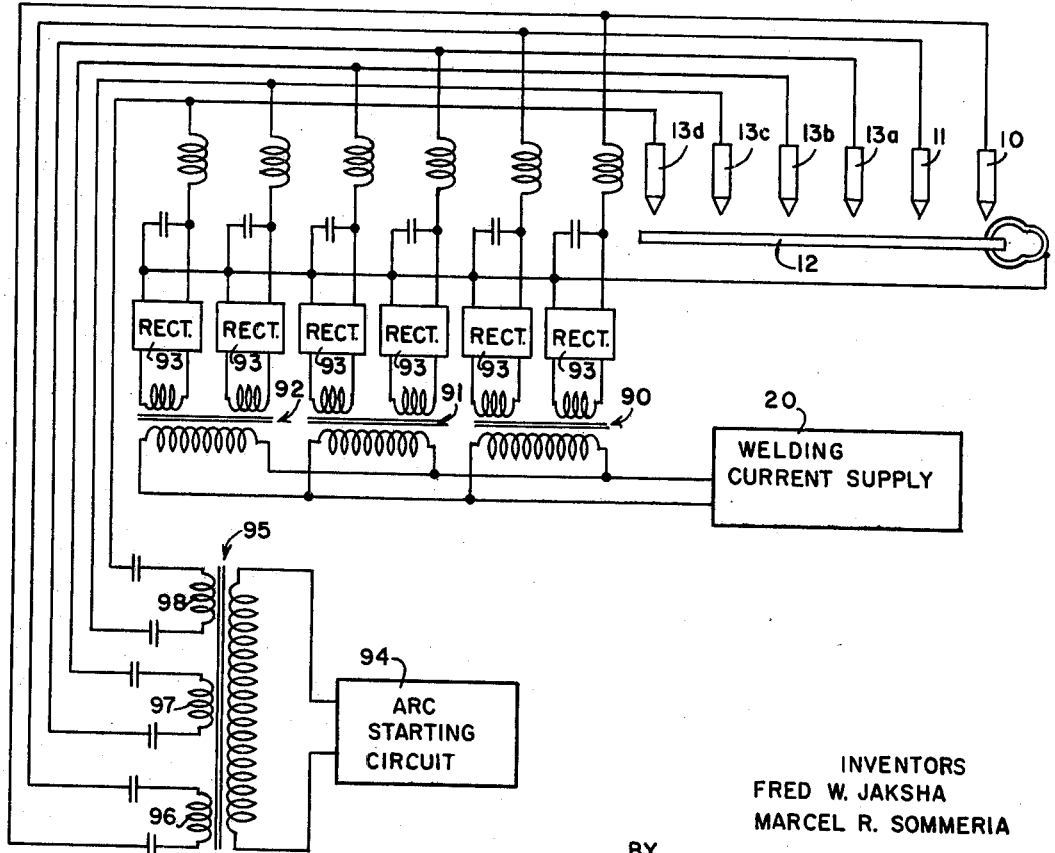
FIG. 3 shows a further embodiment for operating six torches.

FIG. 3 shows a further embodiment of the system of the invention wherein six torches designated 10, 11, 13a, 13b, 13c and 13d are used. The single welding current supply 20 applies current to the output transformers 90, 91 and 92 which have their primary windings connected in parallel to the supply 20. Each transformer has two secondary windings, like the transformer 16 of FIG. 1. These transformers can be of standard construction, and any number can be connected in parallel as required for the number of welds to be made. Each secondary winding is connected through a rectifier circuit 93 to one of the torches. The rectifier circuits can be like the bridge rectifier circuits 15 and 25 in the system of FIG. 1.

The arc starting circuit 94 in the system of FIG. 3 can be the same as in FIGS. 1 and 2. This applies high frequency oscillations to a transformer 95 having three secondary windings 96, 97 and 98. The secondary winding 96 provides a high frequency starting voltage at the torches 10 and 11, secondary winding 97 provides a high frequency starting voltage at the torches 13a and 13b, and secondary winding 98 provides a starting voltage at the welding torches 13c and 13d, all in the manner illustrated in FIG. 1. The circuit, therefore, has a smaller number of secondary windings than welding torches, with a system having an even number of torches requiring only one-half the number of secondary windings as the number of torches. It will be apparent that if an odd number of torches is required, one secondary winding can be connected between a torch and the work piece 12, as illustrated in FIG. 2.

The system of FIG. 3 is like that of FIGS. 1 and 2 in that the high frequency current is applied to the torch through capacitors, and the welding current from the rectifiers is applied through a series choke and shunt capacitor to prevent current flow from one circuit to the other. In this way the high frequency starting current and the welding current are applied to the electrodes of the welding torches in parallel, and each operates independent of the other. As described in the system of FIG. 1, a control circuit actuates the arc starting circuit to apply the high frequency voltages to initiate the arcs, and then after a time delay, the welding current supply provides the welding current and controls the amplitude thereof. A timer controls the duration of the welding current to provide the desired welding action. The control circuit may also control the flow of the inert gas to the torch, with the timer stopping its flow after the welding current is terminated.

It will be apparent that other embodiments of the invention can be used with the number of torches required in a particular application. The welding current is supplied to all the torches from a single unit through separate rectifier circuits so that the control of the system is simplified. The high frequency starting voltage is applied to the torches in parallel with the welding current and the two circuits are isolated so that they are substantially independent of each other. The starting voltage can be applied to two torches in series to thereby simplify the starting circuit.

What is claimed is:

1. An arc welding system including in combination, a plurality of welding torches each including an electrode adapted to produce an arc with a work piece, welding current supply means providing a controlled alternating current output, a plurality of rectifier circuits each individually connecting said supply means to one of said electrodes and to the work piece to apply direct current thereto, arc starting means including high frequency generating means, circuit means connecting said high frequency generating means to a pair of said electrodes to initiate arcs thereat which are connected in series through the work piece, said rectifier circuits and said circuit means being connected in parallel to said electrodes, and control means coupled to said welding current supply means and to said high frequency generating means, said control means causing operation of said generating means at the initiation of each welding operation to start an arc at each of said electrodes and controlling the current supplied by said welding current supply means to thereby simultaneously control the welding current applied by said rectifier circuits to each of said electrodes.

2. An arc welding system including in combination, a pair of welding torches each including an electrode adapted to produce an arc with a work piece, welding current supply means providing a controlled alternating current output, a pair of rectifier circuits each individually connecting said supply means to one of said electrodes and to the work piece to apply direct current thereto, high frequency generating means including an output transformer having a secondary winding with a pair of end terminals, a pair of starting circuits connecting each of said end terminals individually to one of said electrodes to initiate arcs thereat which are connected in series through the work piece, said rectifier circuits and said starting circuits being connected in parallel to said electrodes, and control means coupled to said welding current supply means and to said high frequency generating means, said control means causing operation of said generating means at the initiation of each welding operation to start an arc at each electrode and controlling the current supplied by said welding current supply means to thereby simultaneously control the welding current applied by said rectifier circuits to said electrodes.

3. An arc welding system including in combination, a plurality of welding torches each including an electrode adapted to produce an arc with a work piece, welding current supply means including output transformer means having a plurality of first secondary windings, a plurality of rectifier circuits each individually connecting one of said first secondary windings to one of said electrodes and to the work piece to apply direct current thereto, arc starting means including a spark gap and a resonant circuit having a transformer with a plurality of second secondary windings each having a pair of output terminals, a plurality of starting circuits each coupling one of said output terminals individually to one of said electrodes to initiate an arc thereat, whereby each second secondary winding is connected to a pair of electrodes and the arcs between such electrodes and the work piece are in series, said rectifier circuits and said starting circuits being connected to said electrodes in parallel, and control means coupled to said welding current supply means and to said high frequency generating means, said control means causing operation of said arc starting means to initiate each welding operation, said control means including delay means for actuating said welding current supply means to apply current simultaneously through said rectifier circuits to said electrodes after the arcs are initiated and to terminate the operation of said arc starting means, said control means including timer means for deactuating said welding current supply means after a predetermined time interval.

4. An arc welding system including in combination, a plurality of welding torches each including an electrode adapted to produce an arc with a work piece, welding current supply means including output transformer means having a plurality of first secondary windings, a plurality of bridge rectifier circuits each individually connecting one of said first secondary windings to one of said electrodes and to the work piece to apply direct current thereto, arc starting means including a spark gap and a high frequency resonant circuit coupled thereto, transformer means having primary winding means in said resonant circuit and a plurality of second secondary windings each having a pair of output terminals connected to the ends thereof, a plurality of starting circuits each coupling one of said output terminals to one of said electrodes to initiate an arc thereat, whereby each second secondary winding is coupled to a pair of electrodes and the arcs at such electrodes are connected in series through the work piece, said rectifier circuits each including a portion for blocking the flow of high frequency current therein, said starting circuits each including means for blocking the flow of direct current therethrough, and control means coupled to said welding current supply means and to said arc starting means, said control means energizing said arc starting means to apply a high frequency voltage to said electrodes to initiate each welding operation, said control means actuating said welding current supply means after a time delay to apply current simultaneously through said rectifier circuits to said electrodes and to terminate said arc starting means, said control means including timing means coupled to said welding current supply means to terminate the supply of welding current after a predetermined interval.

5. An arc welding system including in combination, a plurality of welding torches each including an electrode adapted to produce an arc with a work piece, welding current supply means including output transformer means having a plurality of first secondary windings, a plurality of bridge rectifier circuits each individually connecting one of said first secondary windings to one of said electrodes and to the work piece to apply direct current thereto, arc starting means including a spark gap and means applying an alternating current thereto for producing arcs thereacross, transformer means having primary winding means and a plurality of second secondary windings, capacitor means connecting said primary winding means to said spark gap and forming a high frequency resonant circuit which is shock excited by the arcs at said spark gap, a pair of output terminals connected to the ends of each of said second secondary windings, a plurality of starting circuits each respectively coupling one of said output terminals to one of said electrodes to initiate welding arcs thereat, whereby each second secondary winding is coupled to a pair of electrodes and the arcs at such electrodes are connected in series through the work piece, said rectifier circuits each including a portion blocking the flow of high frequency current therein and said starting circuits each including means for blocking the flow of direct current therethrough, and control means coupled to said welding current supply means and to said arc starting means, said control means energizing said arc starting means to apply a high frequency voltage to said electrodes to initiate each welding operation, said control means actuating said welding current supply means after a time delay to apply current simultaneously through said rectifier circuits to said electrodes and to de-energize said arc starting means, said control means including timing means coupled to said welding current supply means to terminate the supply of welding current after a predetermined interval.

6. An arc welding system including in combination, a plurality of welding torches each including an electrode adapted to produce an arc with a work piece, welding current supply means including output transformer means having a plurality of first secondary windings, a plurality of rectifier circuits each individually connecting one of said first secondary windings to one of said electrodes and to the work piece to apply direct current thereto, arc starting means providing a high frequency voltage and including transformer means having a plurality of second secondary windings at least a part of which have a pair of end terminals, a plurality of starting circuits each coupling one of said end terminals to one of said electrodes to initiate an arc thereat, with the arcs at said electrodes coupled to said pair of end terminals of the same second secondary winding being connected in series through the work piece, said rectifier circuits and said starting circuits being connected to said electrodes in parallel and including means providing isolation therebetween, means coupled to said torches to supply an inert gas thereto including valve means for controlling the flow of such gas, and control means including a first portion coupled to said valve means for initiating the flow of gas to said torches, said control means including a second portion coupled to said arc starting means for causing operation thereof to initiate welding operation at each of said torches, said control means including a third portion operating after a time delay to actuate said welding current supply means to supply welding current to said rectifier circuits and to terminate operation of said arc starting means, said control means including timer means connected to said welding current supply means and operating the same after a first time interval to terminate the supply of welding current, and said timer means causing said control means to operate said valve means to terminate the supply of gas to said torches after a second time interval.

7. An arc welding system including in combination, a plurality of welding torches each including an electrode adapted to produce an arc with a work piece, welding current supply means including a plurality of output transformers having primary windings connected in parallel, each of said transformers having a pair of first secondary windings, a plurality of rectifier circuits each individually connecting one of said second secondary windings to one of said electrodes and to the work piece to apply direct current thereto, arc starting means including a spark gap and a resonant circuit having a transformer with a plurality of second secondary windings each having a pair of output terminals, a plurality of starting circuits each coupling one of said output terminals individually to one of said electrodes to initiate arcs thereat, whereby each secondary winding is connected to a pair of electrodes and the arcs between such electrodes and the work piece are in series, said rectifier circuits and said starting circuits being connected to said electrodes in parallel, and control means coupled to said welding current supply means and to said high frequency generating means, said control means causing operation of said arc starting means to initiate each welding operation, said control means including delay means for actuating said welding current supply means to apply current simultaneously through said rectifier circuits to said electrodes after the arcs are initiated and to terminate the operation of said arc starting means, said control means including timer means for deactuating said welding current supply means after a predetermined time interval.

8. An arc welding system including in combination, a plurality of welding torches each including an electrode adapted to produce an arc with a work piece, welding current supply means including a plurality of output transformers having primary windings connected in parallel, each of said output transformers having a pair of first secondary windings, a plurality of rectifier circuits each individually connecting one of said first secondary windings to one of said electrodes to apply direct current thereto, arc starting means providing a high frequency voltage and including transformer means having a plurality of second secondary windings at least a part of which have a pair of end terminals, a plurality of starting circuits each coupling one of said end terminals to one of said electrodes to initiate an arc thereat, with the arcs at said electrodes coupled to said pair of end terminals of the same second secondary winding being connected in series through the work piece, said rectifier circuits and said starting circuits being connected to said electrodes in parallel and including means providing isolation therebetween, means coupled to said torches to supply an inert gas thereto including valve means for controlling the flow of such gas, and control means including a first portion coupled to said valve means for initiating the flow of gas to said torches, said control means including a second portion coupled to said arc starting means for causing operation thereof to initiate welding operation at each of said torches, said control means including a third portion operating after a time delay to actuate said welding current supply means to supply welding current to said rectifier circuits and to terminate operation of said arc starting means, said control means including timer means connected to said welding current supply means and operating the same after a first time interval to terminate the supply of welding current, and said timer means causing said control means to operate said valve means to terminate the supply of gas to said torches after a second time interval.

References Cited

UNITED STATES PATENTS

| | | | |
|---|---|---|---|
| 2,479,087 | 8/1949 | Steward | 219—137 X |
| 2,784,349 | 3/1957 | Anderson | 219—135 X |
| 3,118,051 | 1/1964 | Dixon | 219—137 X |
| 3,154,721 | 10/1964 | Sommeria | 219—131 X |
| 3,242,309 | 3/1966 | Anderson et al. | 219—130 |
| 3,299,249 | 1/1967 | Sciaky | 219—131 |
| 2,599,281 | 6/1952 | Potter | 219—131 |
| 3,324,379 | 6/1967 | Mulder | 219—131 X |

JOSEPH V. TRUHE, Primary Examiner

J. G. SMITH, Assistant Examiner